United States Patent [19]

Inoue

[11] Patent Number: 4,649,255
[45] Date of Patent: Mar. 10, 1987

[54] EDM USING A PARTITION MEMBER TO SEPARATE HYDROCARBON AND WATER LIQUIDS IN THE WORK TANK

[75] Inventor: Kiyoshi Inoue, Tokyo, Japan

[73] Assignee: Inoue-Japax Research Incorporated, Yokohama, Japan

[21] Appl. No.: 616,559

[22] Filed: Jun. 1, 1984

Related U.S. Application Data

[63] Continuation-in-part of Ser. No. 394,509, Jul. 2, 1982, Pat. No. 4,473,733.

[30] Foreign Application Priority Data

Jun. 3, 1983 [JP] Japan ............................. 58-100102
Aug. 1, 1983 [JP] Japan ............................. 58-139457

[51] Int. Cl.$^4$ ........................ B23H 1/08; B23H 7/34
[52] U.S. Cl. ........................... 219/69 M; 204/129.5; 219/69 D
[58] Field of Search ............... 219/69 D, 69 M, 68, 219/69 R, 69 E; 204/129.5, 129.65, 129.7, 129.75, 129.8, 302, 304–308, 224 M

[56] References Cited

U.S. PATENT DOCUMENTS

| | | | |
|---|---|---|---|
| 2,457,234 | 12/1948 | Herbert et al. | 204/129.5 |
| 3,385,947 | 5/1968 | Inoue | 219/69 M |
| 3,399,125 | 8/1968 | Mikoshiba et al. | 204/129.7 |
| 3,472,993 | 10/1969 | Gromov et al. | 219/69 D |

FOREIGN PATENT DOCUMENTS

| | | | |
|---|---|---|---|
| 727210 | 2/1966 | Canada | 219/69 D |
| 1139359 | 11/1962 | Fed. Rep. of Germany | 219/69 D |
| 3225424 | 3/1983 | Fed. Rep. of Germany | |
| 3310995 | 9/1983 | Fed. Rep. of Germany | |
| 41-4563 | 3/1966 | Japan | 204/129.7 |
| 42-1651 | 1/1967 | Japan | 204/129.7 |
| 54-34197 | 3/1979 | Japan | 219/69 D |
| 56-45331 | 4/1981 | Japan | 219/69 D |
| 156131 | 9/1982 | Japan | 219/69 D |
| 940264 | 10/1963 | United Kingdom | 219/69 E |
| 1137061 | 12/1968 | United Kingdom | 204/129.5 |

Primary Examiner—M. H. Paschall
Assistant Examiner—Geoffrey S. Evans
Attorney, Agent, or Firm—Karl F. Ross; Herbert Dubno

[57] ABSTRACT

An improved EDM system includes a partition member which separates a space surrounding a workpiece in a worktank into a first chamber which directly surrounds a machining area of the workpiece and a second chamber outside of the first chamber and surrounding a portion of the workpiece. The machining area and the first chamber are contiguous with each other and flooded with a machining medium constituted by a liquid hydrocarbon to allow successive electrical discharges to be effected therethrough to electroerosively remove material from the workpiece in the first chamber. The second chamber is flooded with a coolant constituted by a water liquid, preferably containing a non-ionic surface active agent dissolved in deionized water, in contact with this portion of the workpiece to cool the latter against heating thereof along the machining area by the erosive discharges in the first chamber.

10 Claims, 3 Drawing Figures

EDM USING A PARTITION MEMBER TO SEPARATE HYDROCARBON AND WATER LIQUIDS IN THE WORK TANK

CROSS-REFERENCE TO RELATED APPLICATIONS

This application is a continuation-in-part of my copending application Ser. No. 394,509 filed July 2, 1982, now U.S. Pat. No. 4,473,733 issued Sept. 25, 1984.

FIELD OF THE INVENTION

The present invention relates generally to the electrical-discharge-machining of a conductive workpiece by supplying a machining liquid into a machining gap formed between a tool electrode and the workpiece while repetitively and intermittently applying a voltage pulse across the machining gap flooded with the machining liquid to produce a succession of electrical discharges between the tool electrode and the workpiece, thereby electroerosively removing material from the latter. As material removal proceeds, the tool electrode and the workpiece are relatively displaced so as to continue development of such material-removal discharges until a desired extent of machining is achieved. The invention relates more particularly to an improved method of and apparatus for electrical discharge machining of the type described.

BACKGROUND OF THE INVENTION

Electrical discharge machining (EDM) processes are generally divided into two categories, sinking-type EDM and traveling-wire EDM. In the sinking-type EDM process, the tool electrode is a simple or formed solid electrode designed to form a cavity complementary in shape thereto in a workpiece. In this process, the workpiece is immersed in the machining liquid commonly constituted by a hydrocarbon liquid such as kerosene. A worktank is used to retain the hydrocarbon machining liquid and the workpiece is immersed therein and positioned sufficiently below the surface of this liquid in the worktank. The tool electrode is commonly formed with one or more fluid passages therein through which the machining liquid is supplied to the machining gap. Alternatively or in addition, one or more nozzles are disposed in the region of the tool electrode or the workpiece and used to direct the machining liquid into the machining gap. It has been recognized that this process entails a danger of fire because of the inflammability of the hydrocarbon liquid. When electrical discharges effected through the hydrocarbon liquid are exposed to air, fire tends to develop and may result in property damage. Furthermore, the hydrocarbon liquid upon decomposition by electrical discharges produces gases and mists which tend to pollute the environmental atmosphere. While the danger of fire may be alleviated by adding certain chemicals to the hydrocarbon liquid, this adds to cost and may result in a significant reduction in the machining efficiency.

In the traveling-wire EDM process, the tool electrode is a thin, continuous wire which is axially transported to continuously traverse the workpiece exposed to air. The machining gap formed between the traveling wire electrode and the workpiece needs to be flushed with the machining liquid which, however, with the workpiece always exposed to air, can in no way be an inflammable hydrocarbon liquid as in the sinking-type EDM process. Thus, in the traveling-wire EDM process, it has been the common practice to employ a water liquid as the machining liquid.

With the traveling-wire process gaining increasing popularity attempts have been made to apply a water liquid, which previously found its sole use in that process, to the sinking-type process. It has been found, however, that the water liquid when used in the sinking-type process is incapable of yielding a mirror-finish machined surface as required in an ultra-fine machining range and further is unsuitable for use with "no wear" or "low-wear" machining requirements. Moreover, it has been observed that with the tool machining area reduced, say, to less than several hundred square millimeters, the water machining liquid seldom offers the required machining stability and efficiency in the sinking-type process.

OBJECTS OF THE INVENTION

The present invention seeks to provide an improved EDM method, especially of sinking type, which makes it possible to achieve a desired EDM operation without the danger of a fire and yet affording an excellent machining stability, quality and efficiency, and which method circumvents the disadvantages of a hydrocarbon liquid and a water liquid by using the two liquids in a novel manner.

The present invention also seeks to provide an improved EDM apparatus for carrying out the method described.

SUMMARY OF THE INVENTION

In accordance with the present invention there is provided, in a first aspect thereof, a method of machining a conductive workpiece wherein a tool electrode is spacedly juxtaposed with the workpiece in a machining receptacle to define an erosion gap over a machining area between the juxtaposed electrode and workpiece and a succession of electrical discharges is effected across the said gap over the said area to electroerosively remove material from the workpiece over the said machining area, which method comprises: dividing, by partition means, a space surrounding the workpiece in the machining receptacle into a first chamber directly surrounding and contiguous with the said machining area and a second chamber outside of the first chamber and surrounding a portion of the workpiece: flooding the said machining area and the said first chamber with a machining medium constituted by a liquid hydrocarbon so that the electrical discharges are effected therethrough; and flooding the said second chamber with a coolant constituted by a water liquid in contact with the said portion of the workpiece to sufficiently cool the latter against heating thereof due to the erosive discharges in the said first chamber.

The invention also provides, in a second aspect thereof, an electroerosive machining apparatus having a machining receptacle, means for positioning a tool electrode in spaced juxtaposition with a conductive workpiece in the machining receptacle to define an erosion gap over a machining area between the juxtaposed electrode and workpiece and means for effecting a succession of electrical discharges across the erosion gap over the machining area to electroerosively remove material from the workpiece over the said area, which apparatus comprises: partition means constructed and arranged to divide a space surrounding the workpiece in the said machining receptacle into a first chamber directly surrounding and contiguous with the said machining area and a second chamber outside of the first chamber and surrounding a portion of the workpiece; first fluid supply means for flooding the said machining area and the said first chamber with a machining medium constituted by a liquid hydrocarbon so that the electrical discharges are effected therethrough; and second fluid supply means for flooding the said second chamber with a coolant constituted by a water liquid in contact with said portion of the workpiece to sufficiently cool the latter against heating thereof due to the erosive discharges in the said first chamber.

BRIEF DESCRIPTION OF THE DRAWING

These features of the present invention as well as advantages thereof will become more readily apparent from a reading of the following description when taken with reference to the accompanying drawing in which.

SPECIFIC DESCRIPTION

Figure 1:
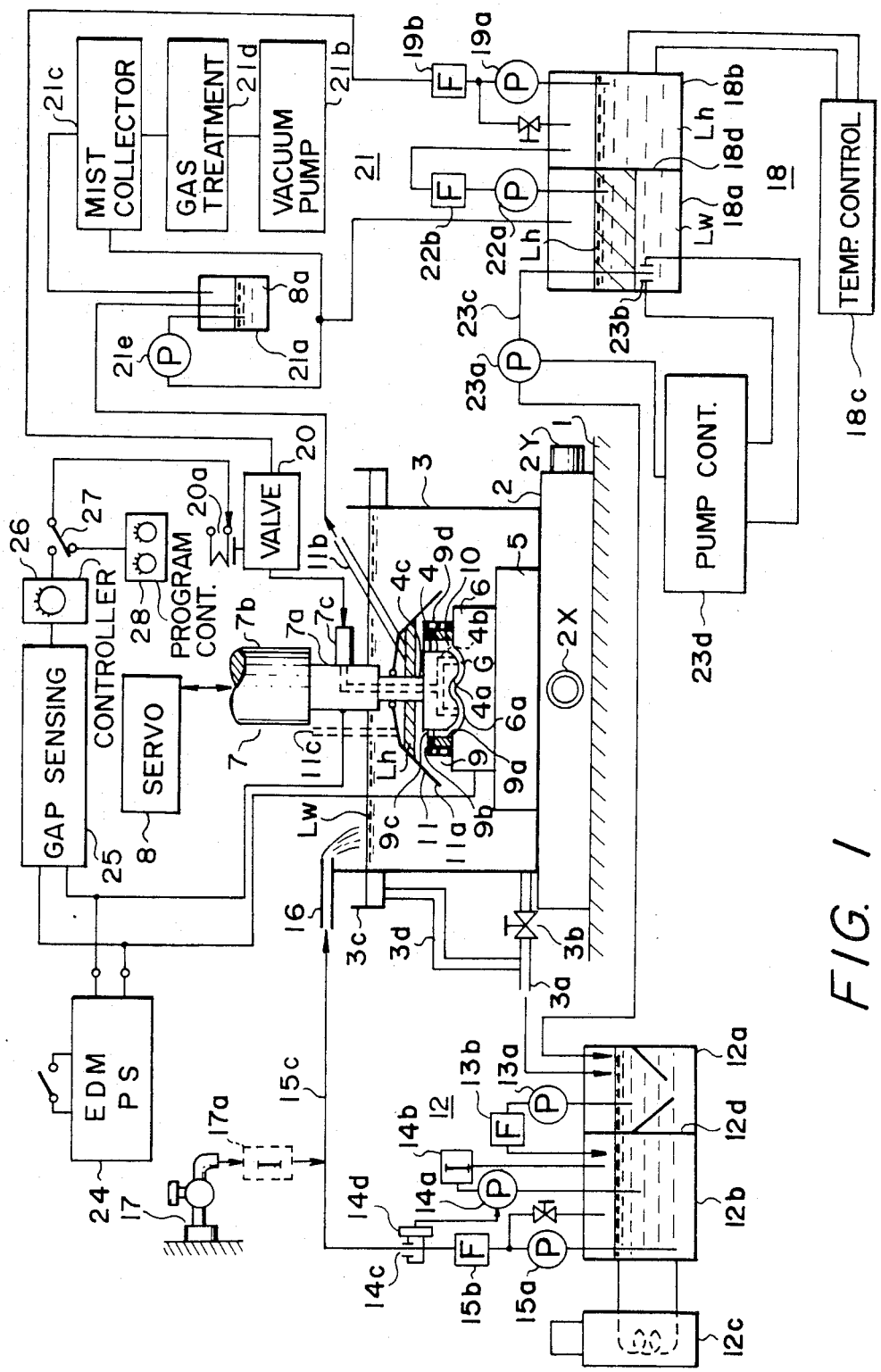
FIG. 1 is a view partly in section and partly in schematic form illustrating embodiments of the invention.

Referring now to FIG. 1 there is shown an apparatus embodying the principles of the present invention as applied to a conventional boring- or sinking-type EDM machine which includes a bed 1 and a cross-table 2 mounted to be slidably movable thereon. The cross-table 2 has a worktank 3 securely mounted thereon and is displaceable in an X—Y or horizontal plane by means of an X-axis drive motor 2x and a Y-axis drive motor 2y. Typically, these motors are controlledly driven by a sequence-controller or numerical-control (NC) unit (not shown) for establishing an EDM position, or for two- or three-dimensional contouring EDM purposes. Where three-dimensional cavity-sinking is to be performed as with a formed tool electrode 4 as illustrated, such a control unit only needs to be prepared to assume a point-to-point positioning function to establish the position of a workpiece in the X - Y plane relative to the axis of the tool electrode 4.

Disposed and fixed in position in the worktank 3 is a worktable 5 which carries a workpiece 6 thereon. The workpiece 6 is positioned in spaced juxtaposition with the tool electrode 4 to define a small machining gap G which is shown between a formed machining surface 4a of the tool electrode 4 and a surface 6a of the workpiece 6 being electroerosively machined therewith. The tool electrode 4 is formed with fluid passages 4b therein which are open to the machining gap G at their respective one ends and which have a common inlet at their other ends. The fluid passages 4b are open out of the tool electrode 4 to the machining gap G primarily at relatively projecting or convex portions on the machining surface 4a or at locations around them. It is desirable that these openings of the fluid passages be distributed uniformly over the entire machining surface 4a of the tool electrode 4.

The worktank 3 is filled with a water liquid Lw to immerse therein the tool electrode 4, the workpiece 6 and the machining gap G defined therebetween. It is essential that the machining gap G be located sufficiently deep below the surface of the water liquid Lw in the worktank 3 and the water liquid Lw in the latter be held in contact with the workpiece 6 to keep it sufficiently cool during the electrical discharge machining operation.

The tool electrode 4 is securely supported by a shank 4c which is in turn detachably supported by a tool head 7. The tool head 7 has a holder 7a supporting the shank 4c and a ram 7b which carries the holder 7a. The tool holder 7a and the shank 4c are bored for supply with a hydrocarbon machining liquid Lh through an inlet 7c fitted to the holder 7a to deliver the hydrocarbon machining liquid through the passages 4b into the machining gap G. The ram 7b is shown as extending coaxially with the tool holder 7a and the electrode shank 4c and is vertically movable by a servo-control unit 8 to displace the tool electrode 4 up and down along a Z-axis which is orthogonal to the X - Y plane.

The lateral surface of the tool electrode 4 is enclosed with a generally annular partition member 9 for or preventing entry of the water liquid Lw into the machining gap G, the member comprising a cylindrical body 9a composed of a rubber, synthetic resin or ceramic or a metal or alloy coated with a resin, rubber or ceramic. The body 9a is shown standing on the workpiece 6 and enclosed with a cup member 9b having a top opening 9c through which the tool electrode 4 is slidably passed. In one embodiment, the cylindrical body 9a is porous and the cup member 9b is formed with apertures 9d through its side wall. The hydrocarbon machining liquid Lh injected into and passed away from the machining gap 7 is thus allowed to pass through the porous body (9a) and then through the apertures (9d) for diffusion into the water liquid Lw. In another embodiment, the cylindrical body 9a need not be porous and the cup member 9b is not apertured (fee from apertures 9d). Thus the cylindrical body 9a and the cup member 9b provide a space separated in a fluid-tight relationship from an outer space laterally surrounding them. In both embodiments, the cylindrical body 9a is, as shown, spaced from side wall of the tool electrode 4 to provide a passage or chamber 10 for the hydrocarbon machining liquid Lh, discharged out of the machining gap G. The cup member 9b is also, as shown, be provided at its top opening 9c with a clearance with the side wall of the tool electrode 4 to enable the hydrocarbon machining liquid Lh to pass therethrough out of the discharge chamber 10 upwardly. The cup member 9b should, preferably, be composed of a permanent magnet material so as to be capable of magnetic attachment to the ferrous workpiece 6 to properly maintain the hydrocarbon flowing chamber 10 and to maintain the hydrocarbon machining liquid Lh therein properly separated from the cooling water liquid Lw.

Disposed to overlie the tool electrode 4 and the workpiece 6 is a covering 11 in the form of a downwardly open box or umbrella to capture the hydrocarbon machining liquid Lh floating through the cooling water liquid from the machining gap G. The covering 11 is supported fittedly through its central opening with the shank 4c should be of a size sufficient to extend over the machining gap G and to thoroughly catch the floating hydrocarbon liquid Lh. The covering may be positioned to immerse its entirety in the water liquid Lw retained in the worktank 3. At the commencement of an EDM operation at least the periphery 11a of the covering at its lower end needs to be immersed in the water liquid Lw. The covering 11 is provided at a portion of its top with a drain conduit 11b for drawing the hydrocarbon liquid Lh floating from the machining gap G and collected beneath the covering 11, together with a portion of the water liquid Lw. The hydrocarbon liquid Lh recovered from the machining gap G is thus effectively prevented from overaccumulation in the covering 11 and flowing out thereof. The covering 11 may also be provided at another portion of its top with a gas removal duct 11c for drawing under suction gases which are produced by decomposition of hydrocarbon and water in the EDM gap 7 and collected with the covering 11.

The worktank 3 is provided with a drain pipe 3a which is led to a first liquid treatment system 12. A valve 3b is provided in the pipe 3a. The worktank 3 has its top rim 3c projected outwards for accepting the overflowing water liquid and permitting it to flow by gravity through a pipe 3d into the drain pipe 3a.

The first liquid treatment system 12 includes a sedimentation tank 12a for receiving the used water liquid Lw from the drain pipe 3a to allow sludges in the received liquid to be sedimented generally by gravity therein. A clearer upper layer of the water liquid in the sedimentation tank 12a is drawn by a pump 13a and passed through a filter 13b for reception in a purified water tank 12b. The latter is equipped with a temperature control (cooling and/or heating) unit 12c for maintaining the purified water liquid in the tank 12b at a predetermined temperature. The water liquid in the tank 12b is recycled by a pump 14a through an ion-exchanger cartridge 14b to control its specific conductivity or resistivity. The conductivity-adjusted water liquid is drawn from the tank 12b by a pump 15a and is thereby fed through an ultra-fine filter 15b into the worktank 3 via an inlet conduit 16 disposed at a top portion of the worktank 3. A conductivity (resistivity) detecting sensor 14c is provided between the filter 15b and the inlet conduit 16 and is connected to a control circuit 14d which is designed to control the operation of the pump 14a, thereby maintaining the specific conductivity or resistivity at a predetermined value in excess of $10^3$ ohm-cm. When a deviation of the conductivity or resistivity from such a preset value is detected by the sensor 14c, the control circuit 14d is operated to actuate the pump 14a (which has been deactuated) to circulate the water liquid in the tank 12b through the ion-exchanger cartridge 14b until the preset conductivity or resistivity of the water liquid is restored.

To the purified water flowing through the water delivery conduit 15c between the ultra-fine filter 15b and the inlet 16 to the tank 3 there may be added a municipal water liquid supplied by a tap 17. Optionally, a further ion-exchange cartridge 17a may be provided between the tap 17 and the water delivery conduit 15c.

In this manner, the worktank 3 is replenished with the refreshed water liquid having a desired conductivity and resistivity, which should be in excess of $10^3$ ohm-cm. Alternatively, the municipal water liquid from the tap 17 may, with or without deionization by the further ion-exchange cartridge 17a, be added to the tank 12b or 12a. The tanks 12a and 12b may as shown be two reservoirs separated by a partition 12d in a single tank unit which is cooled and/or heated by the temperature control unit 12c to maintain the liquids in both reservoirs at an equal predetermined temperature.

The water liquid Lw collected with and immediately under the covering 11 is led into a second liquid treatment system 18. This system is shown as constituted by a single tank comprising two reservoir 18a and 18b separated by a partition 18d therein. The reservoir 18a is designed to receive the contaminated water liquid and to separate it into a water component Lw, a hydrocarbon liquid component Lh and machining products, the latter being sedimented generally by gravity towards the bottom of the reservoir 18a. As shown, the hydrocarbon component Lh because of a lower specific gravity is floating on the water liquid Lw to form the upper layer in the reservoir 18a. The water liquid constituting the lower liquid layer in the reservoir 18a is drawn by a pump 23a into the sedimentation reservoir 12a in the first liquid-treatment system described. A water sensor 23b which embodies a liquid conductivity or resistivity sensor is disposed in the reservoir 18a to detect the presence of the water liquid in the region of an opening of the conduit 23c leading from the pump 23a in the reservoir 18a and is connected to a control circuit 23d associated with the pump 23a. Thus, the pump 23a continues to draw the water liquid Lw into the first liquid-treatment system 12 as long as the sensor 23b detects the water liquid Lw. In this manner, the pump 23a is assured against drawing the hydrocarbon liquid Lh in the reservoir 18a into the first liquid-treatment system 12.

The floating hydrocarbon liquid Lh in the reservoir 18a is drawn by a pump 22a into the second reservoir 18b via a filter 22b. The second reservoir 18b thus recovers a purified hydrocarbon liquid Lh which is drawn by a pump 19a and is thereby fed through an ultra-fine filter 19b and an electromagnetically controlled valve 20 into the machining gap G in the worktank 3 via the inlet 7c to the tool electrode 4. The reservoirs 18a and 18b are cooled and/or heated by a temperature control unit 18c.

The hydrocarbon liquid Lh flushed into the machining gap G via the passage 4b serves as an electrical discharge machining medium and then, entrained with the machining products in the gap G and with an amount of the cooling water liquid Lw in the worktank 3, floats onto the region immediately below the covering 11. As has been described, the contaminated hydrocarbon liquid collected in this manner with the covering 11 is drawn via the outlet 11b into the second liquid-treatment system 18. In the arrangement shown, this contaminated hydrocarbon liquid is drawn by a suction system 21 which includes a tightly sealed receptable 21a in which the liquid is accepted. The space above the liquid Lh in the receptable 21a is evacuated by a vacuum pump or negative pressure means 21b. Mists and gases from the machining liquid Lh in the space within the receptable 21a are collected and treated by a mist collector 21c and a gas-treatment unit 21d provided between the receptable 21a and the negative-pressure source 21b. The machining liquid Lh in the receptacle 21a is drawn by a pump 1e and is led, together with the liquid component separated by the mist collector 21c, into the reservoir 18a in the second liquid-treatment system 18.

An EDM power supply 24 has one output terminal electrically connected to the tool electrode 4 via the conductive tool holder 7a and the conductive electrode shank 4c and the other output terminal electrically connected to the workpiece 6. The power supply 24 may be of any conventional design to supply a train of electrical voltage pulses across the machining gap G between the tool electrode 4 and the workpiece 6. These voltage pulses result in a succession of electrical discharges through the gap G, thereby electroerosively removing material from the workpiece 6.

Connected also to the machining gap 7 is a gap sensing circuit 25 designed to detect one or more electrical gap variables, e.g. gap voltage and/or current, on a per-pulse basis or on an average basis over a number of machining pulses, to monitor the gap stage in the EDM operation. For example, an average gap or discharge voltage and/or current, or a peak discharge current or voltage, or an average discharge current or voltage during each individual pulse, or a high-frequency current or voltage component during each discharge pulse may be detected by the gap sensing circuit 25 and may be compared with one or more reference values preset therein. The output signal of the gap sensing circuit 25 is applied to a control circuit 26 connected with a switch 27 to the energization circuit 20a of the electromagnetic value 20 to selectively open and close the valve 20 or to control the opening of the valve 20. The switch 27 is closed by a program controller 28.

With the valve 20 opened, it will be apparent that the hydrocarbon liquid Lh is forced via the inlet 7c into the machining gap G to flood essentially the entire area thereof defined between the tool electrode 4 and the workpiece 6. The hydrocarbon liquid Lh such as kerosene away from the machining gap G and the passage or chamber 10 tends, owing to its lower specific gravity, to float on the cooling water liquid Lw retained in the worktank 3 and is eventually caught with the covering 11 and drawn through the outlet 11b.

On the other hand, the tool electrode 4 and the workpiece 6 along almost all their surface areas except defining the machining gap and two chamber 10 are held in contact with the water liquid Lw which is higher in thermal conductivity and greater in heat capacity, hence higher in cooling ability than the hydrocarbon liquid Lh such as kerosene. The ability of the water liquid Lw to cool the tool electrode 4 and the workpiece 6 with greater effectiveness allows the on-time or pulse interval between successive voltage pulses to be much reduced and the frequency of these pulses or discharge repetition rate to be markedly increased, thereby increasing the removal rate or shortening the machining time. Furthermore, there is achieved a marked improvement in the relative electrode wear, i.e. the ratio in weight or volume of the wear of the tool electrode 4 to the amount of stock removed from the workpiece 6, as compared with the conventional method (which has heretofore been believed to yield the best result) in which the worktank (3) is filled with a hydrocarbon liquid such as kerosene whose temperature is maintained at 25° C. or so.

It has been found that hydrocarbon gases of 1000 cc are produced together with a minute amount of carbon in removing a ferrous material of 1 gram by electrical discharges and requires 1 cc of kerosene liquid. To achieve a removal rate of 1 gram per minute, it can be seen that the kerosene liquid Lh need be replenished into and through the machining gap G at a volume flow rate of 1 cc/minute. In view of the fact, however, that a portion of the hydrocarbon liquid Lh supplied into the gap G will, without undergoing the EDM action, be passed away from the gap G, this (minimum) flow rate is inadequate in practice. It has been found that the use of a flow rate for the hydrocarbon liquid Lh at least five times as great as this minimum rate is required for satisfactory operation.

Figure 2:
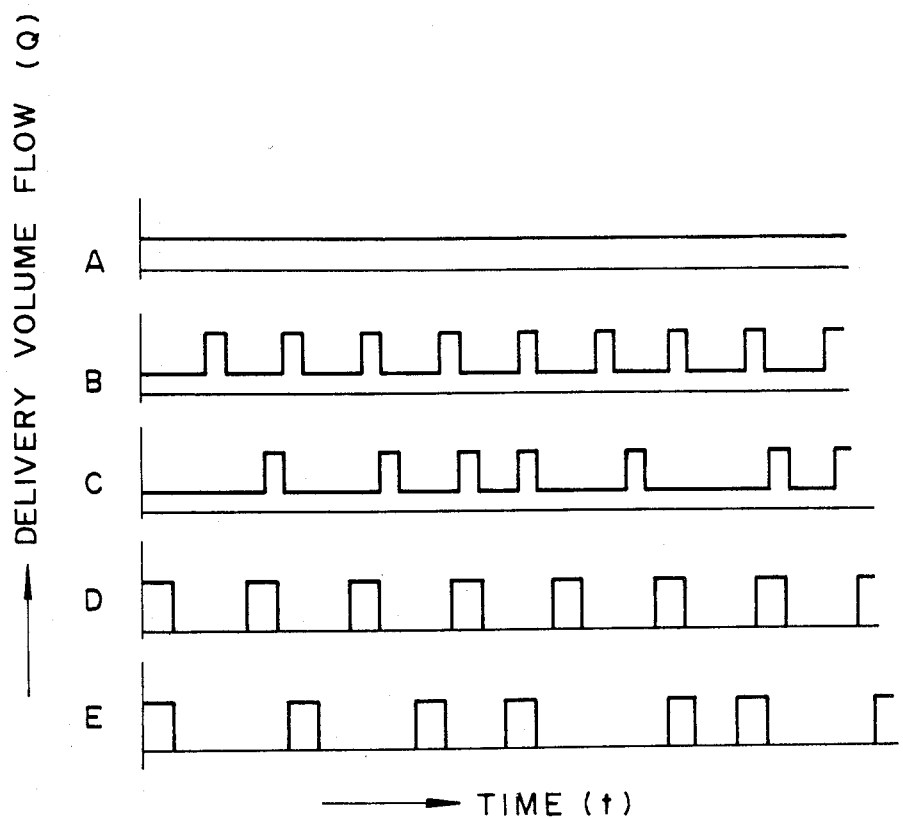
FIG. 2(A)–2(E) are time charts illustrating various modes of delivering the hydrocarbon liquid into the machining gap in accordance with the present invention.

The electromagnetic valve 20 may be operated in any of various modes as shown in time charts (A)–(E) in FIG. 2 to deliver the hydrocarbon liquid Lh from the reservoir 18b into the machining gap G through the inlet conduit 7c. It can be seen that the chart (A) shows a constant delivery (Q) of the hydrocarbon liquid with respect to time. The chart (D) shows that the valve 20 is opened periodically with a predetermined open-time and a predetermined close-time to periodically flush the machining gap C with a predetermined amount of the hydrocarbon liquid Lh. In this case, the controller 28 is designed to provide a succession of signal pulses and connected via the switch 27 to the energizing circuit 20a for the electromagnetic valve 20 to periodically open it. The control circuit 26 remains disconnected form the energization circuit 20a. The chart (B) shows that the valve 20 is held open to secure a minimum constant flow of the hydrocarbon liquid delivered into the machining gap G and the opening of the valve 20 is periodically enlarged to periodically increase the delivery flow. The controller 28 continuously connected to the energization circuit 20a via the switch 27 provides a constant energization signal on which a succession of signal pulses is superimposed. The time chart (E) shows that the control circuit 26 operating in response to the EDM gap sensor 25 is connected to the energization circuit 20a for the electromagnetic valve 20 while the controller 28 remains disconnected therefrom. It is shown that the valve 20 is opened aperiodically with a predetermined open-time and the close-time which varies as a function of the gap state. The chart (C) shows that the valve 20 is held open in response to a continuous signal furnished by the controller 28 to secure a minimum constant flow delivery and the opening of the valve 20 is intermittently enlarged to intermittently increase the flow delivery in response to output signals of the control circuit 26 responding through the sensor 25 to the gap state. The switch 27 keeps the control circuit 26 and the controller 28 connected to the energization circuit 20a. It will be understood that various combinations of the different modes of delivery of the hydrocarbon liquid shown in FIGS. 2(A)–2(E) and described are also possible.

The cooling water liquid Lw preferably consists of 0.1 to 5% by weight an organic or semi-organic substance, which is other than hydrocarbons, and the balance essentially pure or deionized water (i.e. deionized to have a specific resistance ranging between $5 \times 10^3$ and $2 \times 10^5$ ohm-cm, preferably in the order of $10^4$ ohm-cm) It has been found that in spite of provision of the partition member 9, the cooling water liquid Lw may diffuse into the chamber 10 and a peripheral region of the machining gap G and, when this happens, the water liquid Lw, when constituted by water directly from the municipal supply or even water deionized thereupon, tends on the one hand to produce rusting on the workpiece 6 and on the other hand to increase the erosive wear of the tool electrode 4. It has been found that these disadvantages are avoided when the cooling water liquid Lw is composed to contain 0.1 to 5% by weight an organic component and the balance deionized water.

The organic substance or component should desirably be a water, soluble substance and have a component having a chemical bond which is expressed by one of the following chemical formulae:

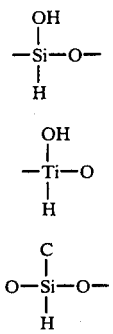

$$\begin{array}{c} \text{OH} \\ | \\ -\text{Si}-\text{O}- \\ | \\ \text{H} \end{array} \quad (1)$$

$$\begin{array}{c} \text{OH} \\ | \\ -\text{Ti}-\text{O} \\ | \\ \text{H} \end{array} \quad (2)$$

$$\begin{array}{c} \text{C} \\ | \\ \text{O}-\text{Si}-\text{O}- \\ | \\ \text{H} \end{array} \quad (3)$$

and a derivative of each thereof. Thus, when the organic substance contains the component (1) or (3) or a derivative of each thereof, the water liquid upon discharge decomposition produces silicon oxide ($SiO_2$). When the organic substance contains the component (2) or a derivative thereof, the machining fluid upon discharge decomposition produces titanium oxide ($TiO_2$). One specific exemplary or preferred such organic substance is a silicone oil. Specifically, the substance should preferably be one which is or is usable as, a non-ionic surface active agent, or a denaturated silicone oil. The latter is preferably a polyether denaturated silicone oil which has a surface tension of 25 to 30 dyne/cm, when contained at a weight proportion of 1% in water and 21 to 31 dyne/cm when contained at a weight proportion of 5% in water. Its specific gravity is 1.00 to 1.10 (at 25° C.) and its refractive index is 1.420 to 1.460 (at 25° C.). It has a viscosity of 100 to several tens of thousands CS (at 25° C.). When contained at a proportion of 10% by weight in water, it has a cloud point of 100° C. When contained at a proportion less than 10% by weight in water, it has a cloud point less than 100° C. The silicone oil should preferably be one having a viscosity (dynamic) in the order of CS or 1000 CS and a cloud point around 100° C. or less.

As noted previously, the partition member 9 is provided to limit or prevent entry of the cooling water liquid into the chamber 10 surrounding the machining gap G, the machining zone of the workpiece 6 and the tool electrode 4. Since a region of the workpiece which is directly adjacent the machining gap G and a substantially portion of the tool electrode (i.e. a region thereof directly adjacent to the gap G and its lateral surface) are thus held in contact with the hydrocarbon liquid Lh, an overcooling of the workpiece 6 and the tool electrode 4, which is detrimental to attempts to obtain higher removal rate and lower electrode wear, is effectively avoided. This provision, by minimizing the possibility that the hydrocarbon machining medium and the water cooling medium may be mixed in the machining site, also ensures that hydrocarbon and water liquids Lh and Lw are circulated and recycled through two separate fluid channels which are completely isolated from each other. Thus, since it is ensured that the hydrocarbon liquid Lh out of the chamber 10 into the outlet 11b contains practically no water component and the water liquid out of the worktank 3 contains practically no hydrocarbon component, both of them practically requires no process of separating each from other than the two liquids which once mixed are difficult to separate or entail complex and expensive separate units as have been described.

Figure 3:
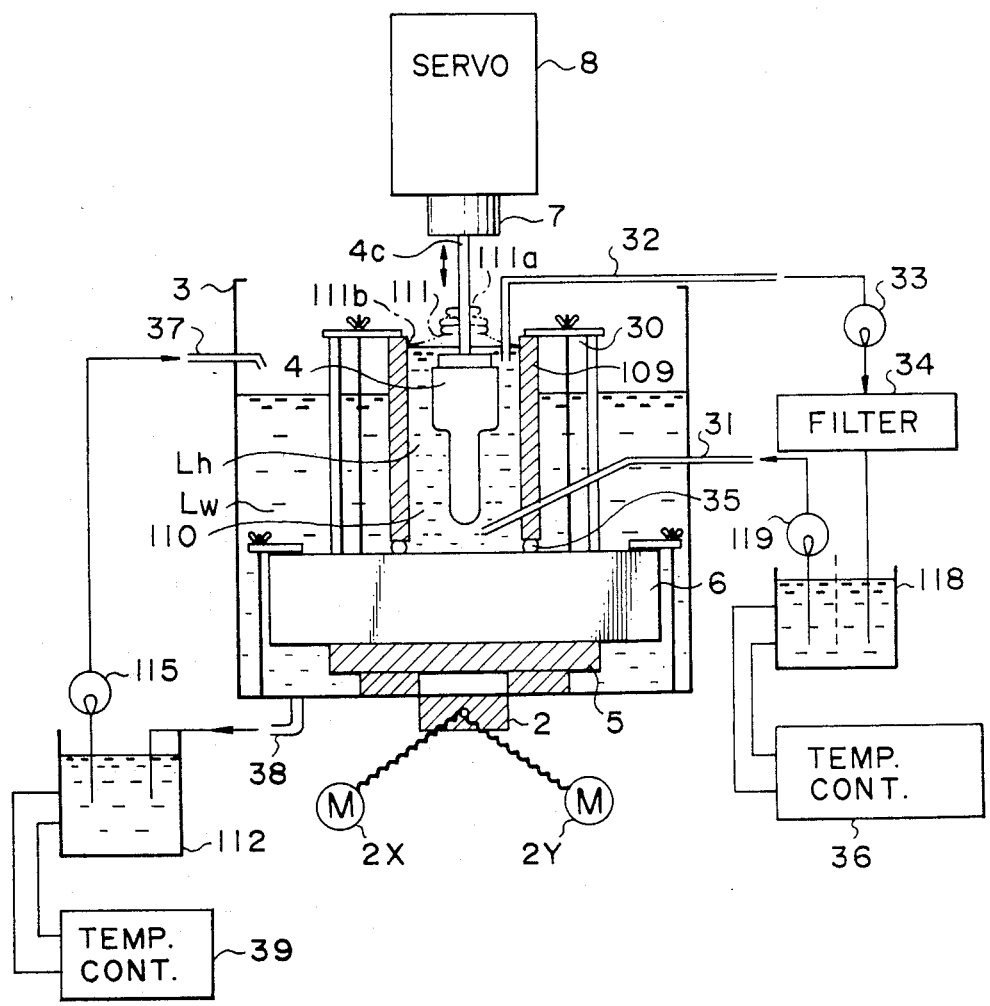
FIG. 3 is a view partly in section and partly diagrammatic form llustrating another embodiment of the present invention.

In the arrangement of FIG. 3, in which the same reference numerals or symbols are used to designate same functional parts and units as in FIG. 1, there is provided another form of the partition member as shown at 109. The partition member 109, which is cylindrical or square in transverse section and arranged to spacedly surround the tool electrode 4 to define chamber 110 filled with the hydrocarbon liquid Lh, is here arranged to extend over the surface of the cooling water liquid Lw retained in the worktank 3 so that the tool electrode 4 supported by the shank 4c can be freely introduced into the hydrocarbon chamber 110 by being carried by the tool head 7 supporting the shank 4c. The partition member 109 is secured in position on the workpiece 6 by means of a plurality of conventional clamping units 31 as the workpiece 6 is securely mounted in the worktank 3 by means of such units. The chamber 110 is arranged to communicate with a reservoir 118 for the hydrocarbon liquid Lh on the one hand via an inlet conduit 31 and on the other hand via an outlet conduit 32.

The hydrocarbon liquid Lh in the reservoir 118 is drawn by a pump 119 and thereby fed into the chamber 110 directly via the inlet conduit 31 as shown or further via fluid passages in the tool electrode (4b) as shown and described previously. The hydrocarbon liquid Lh thus passes through the machining area in conduct with the tool electrode 4 and a machining region of the workpiece 6 and is drawn from the chamber 110 by a pump 33 to return to the reservoir 118 via a filter 34. To prevent the hydrocarbon liquid Lh in the chamber 110 from leaking into the worktank 3 filled with the water liquid Lw, the partition member 109 is clamped upon the workpiece via an O-ring 35 which separates the chamber 110 from the worktank in a fluid-tight isolating relationship. The reservoir 118 is provided with a temperature control unit 36 as previously described to maintain substantially constant the temperature of the hydrocarbon liquid Lh supplied to the chamber 110.

Here again, the worktank 3 is fed with the cooling water liquid Lw from a reservoir 112 via an inlet 37 by means of a pump 115 to maintain the flowing cooling medium Lw in contact with a substantial portion of the workpiece 6 to maintain it sufficiently cooled. The water liquid Lt is discharged from the worktank 3 via a drain conduit 38 into the reservoir 112. The reservoir 112 is provided with a temperature control unit 39 as previously described to cool the heated water liquid from the worktank 3 and to maintain substantially constant the temperature of the water liquid Lw delivered into the worktank 3.

Advantageously, a flowing volume of the hydrocarbon machining liquid Lh (having a relatively low specific gravity) is maintained in the chamber 110 such that its surface, as shown, lies far upper in level than that of the cooling water liquid Lw in the worktank 3 so that the static pressure on the surface of the workpiece 6 of the hydrocarbon liquid in the chamber 110 is balanced with that of the water liquid in the worktank 3. In this manner a diffusion of the water liquid Lw into the hydrocarbon liquid Lh or vice versa across the 1 partition member 109 is effectively minimized. The hydrocarbon liquid Lh filing the chamber 110 is preferably much smaller in volume than the water liquid Lw contained in the worktank 3. Thus, if a fire happens to occur in the chamber 110, it will cease promptly by deactuating the pump 119 to halt the supply of the hydrocarbon liquid from the reservoir 118.

Preferably, the partition member 109 has a cover member 111 associated therewith so as to hermetically close or closely seal the chamber 110 filled with such a flowing volume of the hydrocarbon liquid Lh. The hydrocarbon liquid Lh in the chamber 110 is thus effectively isolated from the atmosphere (oxygen) to minimize the possibility of a fire. The cover member 111 has a central opening for accepting the support 4c for the tool electrode 4. The cover member 111 may be secured at its central opening 111c to the electrode support 4c and may along its periphery 111b be movable with the electrode 4 while maintaining a sliding contact with the inner wall of the partition member 109. Alternatively, the cover member 111 may be secured to the partition member 109 to allow a vertical movement of the electrode shank 4c through the central opening 111b. In a further alternative, the cover member 111 may be secured to both the shank 4c and the partition member 110 and be constructed in the form of a bellows as shown to allow the electrode 4 to move up and down. The cover member 111 may be provided with a gas/mist ventilator as previously described.

What is claimed is:

1. A method of machining a conductive workpiece wherein a tool electrode is spacedly juxtaposed with the workpiece in a machining receptacle to define an erosion gap over a machining area between the juxtaposed electrode and workpiece and a succession of electrical discharges are effected across said gap over said area to electroerosively remove material from the workpiece over said machining area, the method comprising the steps of:

dividing, by partition means, a space surrounding a workpiece in a machining receptacle into a first chamber directly surrounding and contiguous with a machining area and a second chamber outside of said first chamber and surrounding a portion of said workpiece which is remote from said machining area;

flooding said machining area and said first chamber with a machining medium constituted by a liquid hydrocarbon so that electrical discharges are effected therethrough;

flooding said second chamber with a coolant constituted by a water liquid in contact with said portion of the workpiece to sufficiently cool the latter against heating thereof due to the erosive discharges in said first chamber; and relatively displacing the tool electrode and the workpiece to advance removal of material in the workpiece during said flooding of said area and said chambers.

2. The method defined in claim 1 wherein said partition means is constructed and arranged so as to minimize entry of said coolant into said first chamber.

3. The method defined in claim 2 wherein said partition means is constructed and arranged so as to minimize diffusion of said machining medium into said second chamber.

4. The method defined in claim 1 wherein said coolant consists of 0.1 to 5% by weight a non-ionic surface active agent having a cloud point and the balance essentially deionized water.

5. The method defined in claim 4 wherein said deionized water has a specific resistance ranging between $5 \times 10^3$ ohm-cm and $2 \times 10^5$ ohm-cm.

6. An electroerosive machining apparatus having a machining receptacle, means for positioning a tool electrode in spaced juxtaposition with a conductive workpiece in the machining receptacle to define an erosion gap over a machining area between the juxtaposed electrode and workpiece and means for effecting a succession of electrical discharges across the erosion gap over the machining area to electroerosively remove material from the workpiece over said area, the apparatus comprising:

partition means constructed and arranged to divide a space surrounding a workpiece in a machining receptacle into a first chamber directly surrounding and contiguous with a machining area and a second chamber outside of said first chamber and surrounding a portion of said workpiece which is remote from said machining area;

first fluid supply means for flooding said machining area and said first chamber with a machining medium constituted by a liquid hydrocarbon so that electrical discharges are effected through said liquid hydrocarbon;

second fluid supply means for flooding said second chamber with a coolant constituted by a water liquid in contact with said portion of the workpiece to sufficiently cool the latter against heating thereof due to the erosive discharges in said first chamber; and means for relatively displacing the tool electrode and the workpiece to advance the removal of the material in said workpiece.

7. The apparatus defined in claim 6 wherein said partition means is constructed and arranged to separate said first and second chambers from each other in a substantially fluid-tight relationship.

8. The apparatus defined in claim 7, further comprising cover means associated with said partition member and said tool electrode for closing said first chamber substantially isolated from the atmosphere.

9. The method defined in claim 1 wherein said partition means is maintained in position dividing said space while said tool electrode and said workpiece are relatively displaced to advance removal of material in said workpiece.

10. The apparatus defined in claim 7, further comprising cover means associated with said partition means and a support of said tool electrode for closing said first chamber substantially isolated from the atmosphere.

* * * * *